Sept. 24, 1968 C. H. HENDERSON ET AL 3,403,240
PORTABLE REMOTE INDUCTION BRAZING STATION WITH FLEXIBLE LEAD
Filed Sept. 2, 1965 3 Sheets-Sheet 1

INVENTORS.
CHARLES H. HENDERSON
LOUIS A. VIGNEAULT
DONALD E. TOMPSON
BY

John M. Pease

ATTORNEY

Sept. 24, 1968  C. H. HENDERSON ET AL  3,403,240
PORTABLE REMOTE INDUCTION BRAZING STATION WITH FLEXIBLE LEAD
Filed Sept. 2, 1965  3 Sheets-Sheet 2

INVENTORS.
CHARLES H. HENDERSON
LOUIS A. VIGNEAULT
DONALD E. TOMPSON
BY

John M. Pease

ATTORNEYS

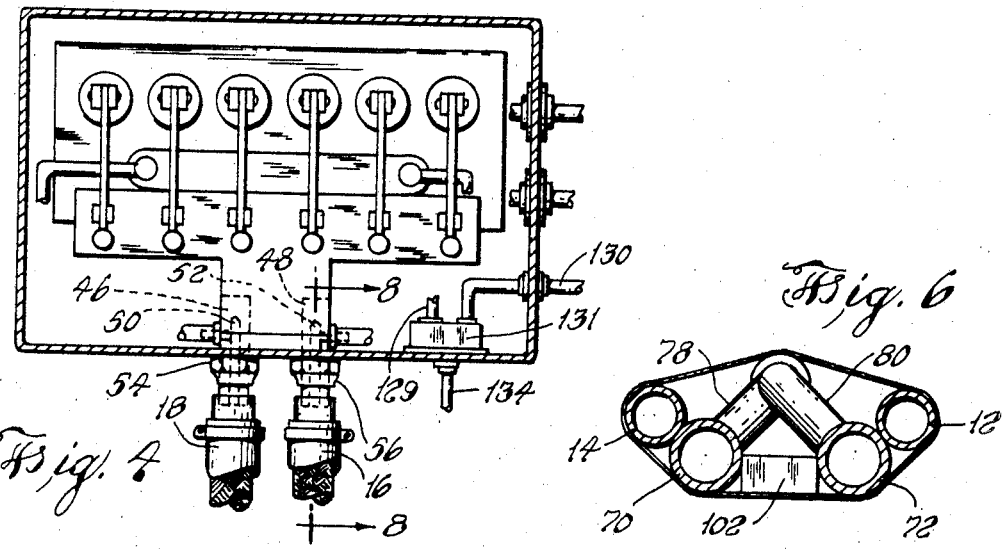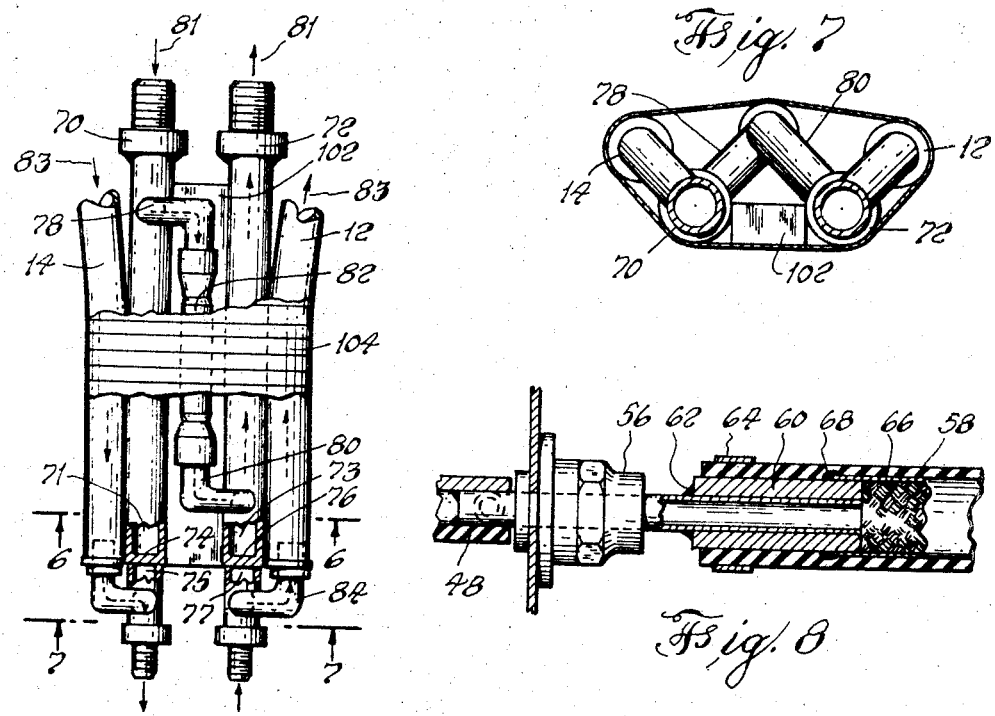

United States Patent Office 3,403,240
Patented Sept. 24, 1968

3,403,240
PORTABLE REMOTE INDUCTION BRAZING
STATION WITH FLEXIBLE LEAD
Charles H. Henderson, Hampton Falls, Louis A. Vigneault, Dover, and Donald E. Tompson, Rochester, N.H., assignors to the United States of America as represented by the Secretary of the Navy
Filed Sept. 2, 1965, Ser. No. 484,776
5 Claims. (Cl. 219—10.49)

ABSTRACT OF THE DISCLOSURE

A portable induction brazing apparatus that includes a central work station to which is supplied cooling fluid and an R.F. induction tubular heating element. The circulating cooling fluid is connected to the induction element via flexible fluid cooled electrical cable so as to form a continuous fluid path.

---

Figure 1:
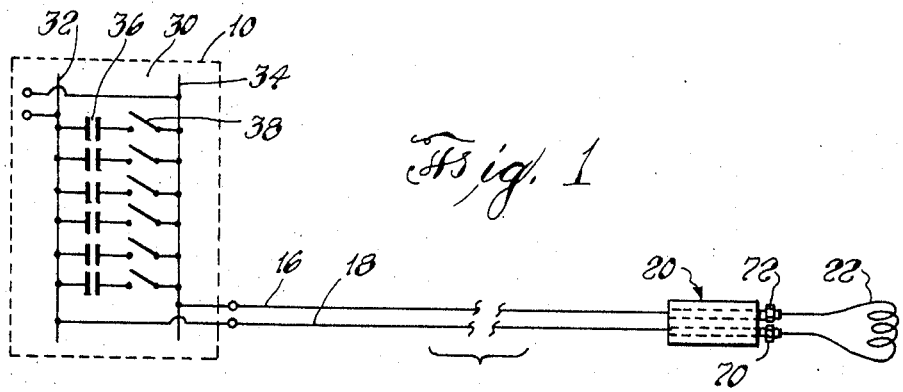

The invention described herein may be manufactured and used by or for the Government of the United States of America for governmental purposes without the payment of any royalties thereon or therefor.

This invention relates to portable induction brazing apparatus and more particularly to an improved apparatus useful in silver brazing and combining a small, compact, light weight portable remote work station with improved water-cooled flexible leads and a split type water-cooled heating element.

The equipment is most useful in joint brazing in confined quarters involving interference piping such as on a submarine.

Conventional methods of induction brazing involve equipment too bulky and heavy to be used under the circumstances involved. Normally such equipment includes an auto transformer and several cumbersome and unwieldy power and cooling water leads as well as requirements for jigs and fixtures.

Other conventional equipment which is not too bulky, heavy and cumbersome such as torch heating involve other disadvantages, for example the quality of a joint formed by torch heating is inferior and less reliable than induction silver-brazed joints. This is due in part to the uneven heating inherent in torch heating and to the uneven application of heat due to the difficulty of interfering pipes and structures. Further disadvantages lie in the requirement of interference removal around the joint such as electrical cables, equipment, formica and other objects which would be destroyed by open flame. A further disadvantage of torch heating lies in the heat developed by the torch in close quarters making it difficult for the operator to remain on the job and the risk of explosion and fire aboard the ship.

Thus, to applicants' knowledge there is no conventional equipment which can be used under conditions indicated above and which will provide the advantages mentioned.

It is an object of this invention to provide an improved portable induction brazing apparatus which can be used under the conditions mentioned above and provide improved joint quality under such conditions.

A further more specific object is to provide a light weight, compact portable remote brazing unit having power and water leads of maximum flexibility.

Another object is to provide in such equipment an improved arrangement for holding an induction element and suplying the same with cooling fluid and electric power.

Other objects and advantages will appear from the following description of an example of the invention, and the novel features will be particularly pointed out in the appended claims.

Figure 3:
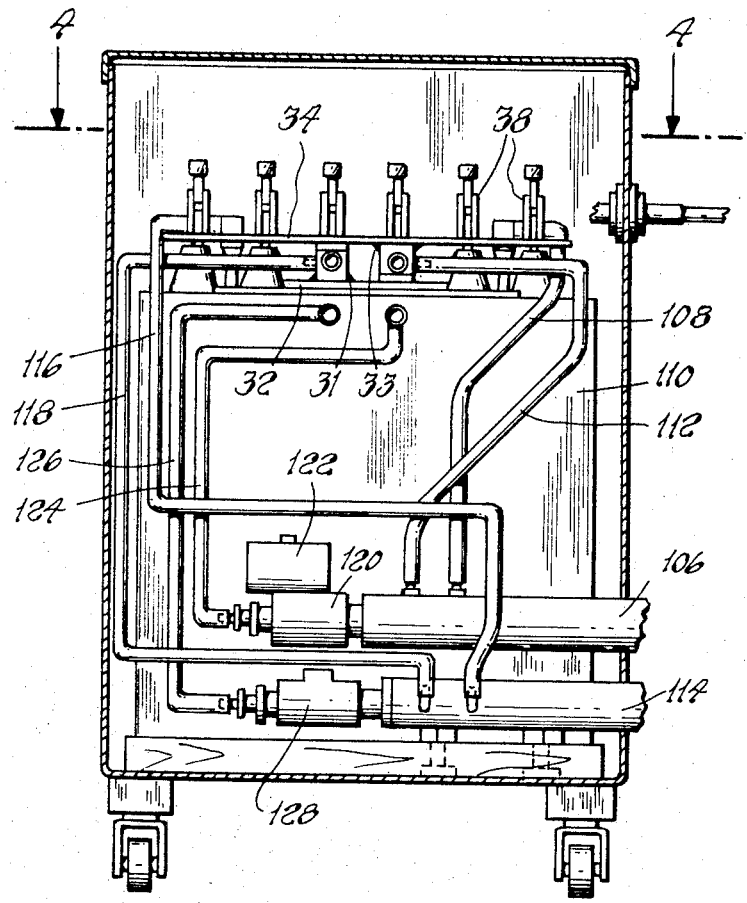
Figure 2:
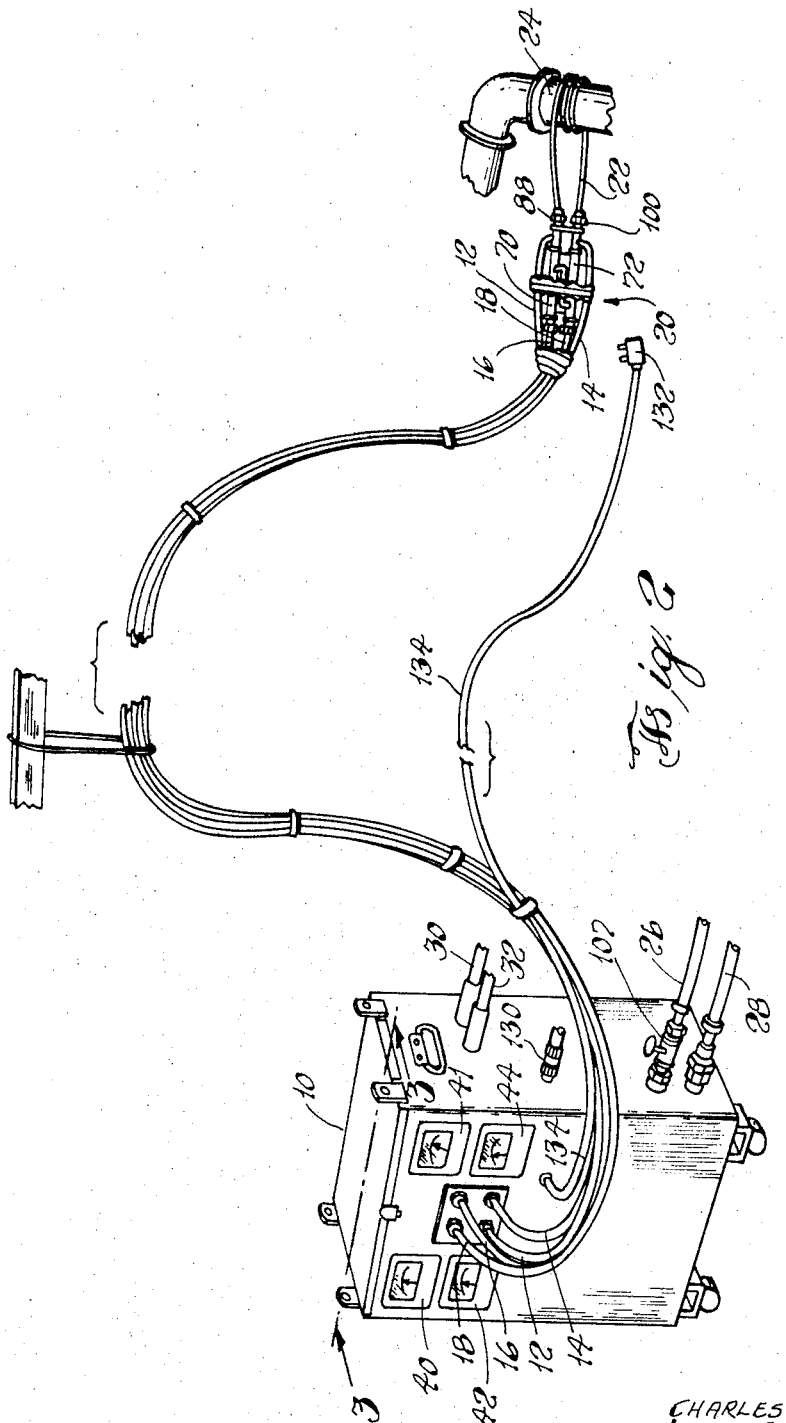

In the drawings:

FIG. 1 is a diagramatic view of an electrical circuit employed in the exemplary apparatus used to describe the invention, FIG. 2 is a perspective view of apparatus incorporating the invention including a work unit, flexible leads, holder and induction heating element, and showing the application to a joint to be brazed, FIG. 3 is an enlarged elevational view taken on 3—3 of FIG. 2 showing details of the inside of the portable work unit shown in FIG. 1, FIG. 4 is an enlarged plan view taken on line 4—4 of FIG. 3 showing further details of the work unit, FIG. 5 is an enlarged side view partly in cross section and partly broken away to show details of the holder shown in FIG. 2, FIGS. 6 and 7 are cross sectional views taken respectively on lines 6—6 and 7—7 of FIG. 5, and FIG. 8 is an enlarged elevational view partly in cross section showing part of one of the flexible watercooled cables shown in FIG. 1 and showing the means for connecting the same to the work unit.

Referring to the drawings and initially to FIG. 2 there is shown a work unit generally indicated at 10, a plurality of flexible leads including cooling water transferring conduits 12 and 14 and watercooled electrical conduits 16 and 18, an adaptor or handle generally indicated at 20, an induction heating element 22 and a work piece 24 which is being heated in the processing of brazing the work piece 24, cooling water is supplied to and from the work unit respectively by incoming line 26 and drain line 28. High frequency induction heating power is supplied to the work unit from source lines 30 and 32. Power is supplied to the lines 30 and 32 from any suitable source such as a motor generator set (not shown) of suitable rating. Applicants' unit has been operated from motor-generator sets of 30 kw. (or larger) capacity and 220 volt output in the 10 kc. frequency range. 10 kc. equipment is preferred from a safety factor point of view.

Referring to FIG. 1 showing diagrammatically the basic electrical circuit in applicants' apparatus, there is provided in the unit 10 a watercooled tap changing capacitor generally indicated at 30 and including bus bars or plates 32 and 34, a plurality of capacitors 36 connected in parallel between the bus bars by switches 38. Power is applied to the bus bars 32 and 34 through incoming lines 30 and 32 connected thereto. Power is supplied to the heating element 22 from the bus bars 32 and 34 through the water-cooled electrical leads 16 and 18 and tubular conductor elements 70 and 72 of the handle 20 as will be described hereinafter. Current in the induction heating element is adjusted manually by setting of the several capacitor switches 38. As shown in FIG. 2 a voltmeter 40, ammeter 41, kw. meter 42 and kvar. meter 44 are connected in the electrical circuit in the conventional manner to indicate visually the condition of current being delivered to the heating element.

Referring to FIGS. 3 and 4 adaptors 46 and 48 are connected respectively to bus plates 32 and 34 by welding as indicated at 31 and 33 or other suitable means to carry electrical current to the electrical leads 16 and 18. The adaptors 46 and 48 are formed with passageways 50—52 to pass cooling fluid to the electrical leads 16 and 18. Conventional flare type fittings 54 and 56 are provided to connect the leads 16 and 18 to the work unit 10.

As shown in FIG. 8 the watercooled electrical lead 16 includes an outer rubber hose 58 fitted on an annular spacer 60 of conductive material welded as at 62 to the fitting 56. The hose is clamped on the spacer 60 by a suitable clamp 64 to provide a proper fluid seal for the lead 16. Electrical current is carried through the lead 16 by a cylindrical flexible copper braid 66 which is brazed to the conductive spacer 60 as at 68. Lead 18 is constructed and connected to its fitting 54 in the same manner.

The opposite ends of leads 16 and 18 are connected respectively in the same manner to tubular elements 70 and 72 which form part of the handle indicated generally at 20 in FIG. 1 and which is shown in detail in FIGS. 5, 6 and 7. Tubular elements 70 and 72 are formed of copper or other suitable conducting material to pass electric current and are blanked off by partitions as indicated at 74 and 76 to provide in the tubular elements 70—72 separate water passageways 71, 73, 75 and 77 as indicated. Elbow connectors 78 and 80 together with an interconnecting section of electrical insulation hose 82 of rubber or other suitable material are connected between the tubular elements 70–72 to pass cooling fluid from element 70 to element 72 as indicated by the arrows 81 and at the same time avoid electrical connection between the elements such that electrical current will pass through the heating element 22. The length of the fittings and interconnecting hose is such as will house a water column length adequate to maintain a sufficient potential drop between the elements 70 and 72 to avoid creating an interfering electrical path.

Separate cooling fluid for the induction heating element 22 is supplied from conduits 12 and 14 connected respectively to elements 72 and 70, through elbows 84 and 86. The elbows 84–86 are connected to the elements 72–70 adjacent the chambers 77 and 75 respectively. The induction heating element 22 as shown in FIG. 2 is detachably connected to tubular elements 70–72 by conventional flair type fasteners 88 and 100. As indicated by the arrows 83 in FIG. 5 cooling water for the heating element 22 is received from conduit lead 14 through elbow 86 and chamber 75 and is returned to the work unit 10 through chamber 77, elbow 84 and conduit lead 12.

Referring to FIGS. 5, 6, and 7, to form a handle for the operator to manipulate the heating element 22 the tubular elements 70 and 72 with their inter-connection 78, 82 and 80 and the ends of water conduit leads 12 and 14 are mounted on a spacer 102 of electrical insulation material and bound thereto by a wrapping 104 of insulation tape, the tape being shown broken away in FIG. 5 to show details of the several elements.

As indicated in FIG. 2 cooling water is supplied to the work unit 10 from a supply line 26 and returned to drain by line 28. Referring to FIG. 3 an incoming water manifold 106 is supplied with water from line 26, a shut off valve 107 as shown in FIG. 2 being provided between the supply line 26 and the manifold 106. From the manifold 106 water at normal main pressure is supplied by conduit 108 to the capacitor cooling tank 110 and by conduit 112 to the water cooled cable 16. Water is returned to drain line 28 via a drain manifold 114 from the capacitor tank 110 by a conduit 116 and from the water cooled cable 18 by a conduit 118. Water at regulated pressure is supplied from manifold 106 through a solenoid operated water valve 120 and a conduit 124 connected to conduit 14 supplying the heating element 22 with cooling water. The solenoid for valve 120 is indicated at 122. Water is returned from the heating element 22 through conduit 12 which is connected by a conduit 126 and a check 128 to the return manifold 114.

The solenoid 122 is connected by line 129 and control box 131 to a control cable 130 shown in FIG. 4 which in turn is connected to the power supply motor-generator set (not shown) to actuate the valve 120 through solenoid 122 to open position and supply cooling water to the induction heating element 22 only when power is being delivered to the heating element. The check valve 128 is provided in the water return line from the induction heating element to the drain manifold 114 to prevent water backing up from the manifold 114 toward the element handle 20 when the heating element is disconnected. Control of power supply to the work station 10 by the heating element operation is provided by an off-on control switch 132 connected through electrical cable 134 and control box 131 to the control cable 130 leading to the motor-generator set (not shown) suitable carrying handles 136 and casters 138 are provided for carrying and wheeling the work unit 10. The entire work unit weighs about 85 pounds and has dimensions of about 10" x 16" x 21" high.

In operation because of its light weight and small size the unit is easily transported to areas inaccessible to conventional induction heating equipment. The equipment is particularly useful in the confined spaces of a submarine hull. After being placed in the work area the incoming power, control cable and water supply lines are connected to the unit. The induction heating element is fitted on the joint to be brazed and connected to the element handle. The equipment is then under the control of the operator by way of the manual push button control 132. Current may be selected as desired by selective operation of the capacitor switches.

The provision of separate cooling water to the induction heating element and to the water-cooled power leads reduce the size of work cable required thereby providing lighter weight and increased flexibilty. Transformers which would increase the size and weight equipment are not required. Conventional jigs on tools for supporting the heating element are not required. The heating element is easily maneuvered and positioned because of the minimum weight and maximum flexibility of the power leads for the heating element and because of the compact handle arrangement. Thus, each of the objects set forth herein are accomplished under the subject invention.

It will be understood that various changes in the details, materials and arrangement of parts, which have been herein described and illustrated in order to explain the nature of the invention, may be made by those skilled in the art within the principle and scope of the invention as expressed in the appended claims.

We claim:
1. A portable induction brazing apparatus comprising:
a tubular induction heating element,
a work station unit adapted for connection to a source of cooling fluid under pressure and to a source of induction heating current,
said unit including a power factor correcting water-cooled capacitor with tap changing switches for supplying an induction heating current of adjustable value to said element, further including intake and exhaust manifolds adapted for detachable connection respectively to a source of cooling water under pressure and a drain means, and means for detachably connecting said manifolds to said cable and hoses to circulate cooling water therethrough, and
means for connecting said capacitor to said manifolds to circulate cooling fluid through said capacitor,
means including flexible hoses connected to said unit and to said element to pass cooling fluid to said element,
means including flexible fluid cooled electrical cables connected to said element to pass induction heating current thereto and connected to said unit to receive adjusted induction heating current,
means connecting said cables adjacent the heating element ends thereof to form a continuous cooling fluid path, and
said cables being connected at their opposite remaining ends to said work unit as a source of cooling fluid.

2. A portable induction brazing apparatus according to claim 1,
said flexible cables each including a flexible braid electrical conductor, a detachable type hollow fitting of electrical conducting for each end of said braid for connecting said cable to said work station unit and to the heating element, said fittings being secured to said braid conductor, and a hose of electrical insulating material enveloping said conductor and secured in water tight connection to said fittings.

3. A portable induction brazing apparatus according to claim 1, including
an induction element holder for connecting said element to said cables and hoses and for manually manipulating said element,
said holder including spaced conductor means detachably connectable to said cables and to said element to pass current thereto, conduit means providing fluid communication between said cables, additional conduit means detachably connectable to said hoses to pass cooling fluid through said element and insulation means to insulate said conductors from each other and from a person manipulating said element.

4. A portable induction brazing unit according to claim 3,
said conductor means including two elongated conductors each recessed from one end to forming a pivot set of chambers respectively in fluid communication with said cables and each recessed from the opposite end to form additional chambers respectively in fluid communication with opposite ends of said induction element,
each of said chambers being apertured to receive a fluid fitting,
said conduit means including fittings interconnected by a conduit of insulating material and connected in fluid communication with said first chambers,
said additional conduit means including fittings connected respectively to said additional chambers and adapted for connection to said hoses.

5. A portable induction brazing apparatus comprising:
a tubular induction heating element,
a work station unit adapted for connection to a source of cooling fluid under pressure and to a source of induction heating current,
said unit including a power factor connecting capacitor with top changing switches for supplying an induction heating current of adjustable value to said element,
means including flexible hoses connected to said unit and to said element to pass cooling fluid to said element,
means including flexible fluid cooled electrical cables connected to said element to pass induction heating current thereto and connected to said unit to receive adjusted induction heating current,
an induction element holder for connecting said element to said cables and hoses and for manually manipulating said element,
said holder including spaced conductor means detachably connectable to said cables and to said element to pass current thereto, conduit means providing fluid communication between said cables, additional conduit means detachably connectable to said hoses to pass cooling fluid through said element and insulation means to insulate said conductors from each other and from a person manipulating said element,
said conductor means including two elongated conductors each recessed from one end to form a pivot set of chambers respectively in fluid communication with said cables and each recessed from the opposite end to form additional chambers respectively in fluid communication with opposite ends of said induction element,
each of said chambers being apertured to receive a fluid fitting,
said conduit means including fittings interconnected by a conduit of insulating material and connected in fluid communication with said first chambers,
said additional conduit means including fittings connected respectively to said additional chambers and adapted for connection to said hoses,
means connecting said cables adjacent the heating element ends thereof to form a continuous cooling fluid path, and
said cables being connected at their opposite remaining ends to said work unit as a source of cooling fluid.

References Cited

UNITED STATES PATENTS

| | | | |
|---|---|---|---|
| 2,676,235 | 4/1954 | Kennedy et al. | 219—10.75 X |
| 2,820,875 | 1/1958 | Werych et al. | 219—10.75 |
| 3,007,022 | 10/1961 | Jackson et al. | 219—9.5 |
| 3,110,793 | 11/1963 | Worthington | 219—9.5 |
| 3,031,554 | 4/1962 | Jackson | 219—9.5 |
| 3,238,346 | 3/1966 | Savko | 219—10.75 X |
| 3,311,732 | 3/1967 | Stein et al. | 219—10.49 |

RICHARD M. WOOD, *Primary Examiner.*

L. H. BENDER, *Assistant Examiner.*